United States Patent [19]

Okuyama et al.

[11] Patent Number: 5,194,107
[45] Date of Patent: Mar. 16, 1993

[54] BELT-LIKE MEMBER ATTACHING METHOD AND APPARATUS

[75] Inventors: Koji Okuyama; Makoto Yamamoto, both of Kodaira, Japan

[73] Assignee: Bridgestone Corporation, Tokyo, Japan

[21] Appl. No.: 680,014

[22] Filed: Apr. 2, 1991

Related U.S. Application Data

[63] Continuation of Ser. No. 481,654, Feb. 14, 1990, abandoned, which is a continuation of Ser. No. 238,443, Aug. 31, 1988, abandoned.

[30] Foreign Application Priority Data

Sep. 3, 1987 [JP] Japan .................. 62-221059
Sep. 3, 1987 [JP] Japan .................. 62-221060

[51] Int. Cl.$^5$ ............................... B32B 31/00
[52] U.S. Cl. ........................ 156/64; 29/407; 156/123; 156/133; 156/405.1; 242/57; 242/67.2
[58] Field of Search ............... 29/407, 429, 701, 702, 29/703, 706, 707, 709, 714, 717, 720, 728, 819, 820; 156/64, 350, 361, 362, 123, 133, 405.1; 242/57, 67.2

[56] References Cited

U.S. PATENT DOCUMENTS

| | | | |
|---|---|---|---|
| 3,623,677 | 11/1971 | Appleby | 242/57 X |
| 3,898,116 | 8/1975 | Katagiri et al. | 156/123 X |
| 4,474,338 | 10/1984 | Hirano et al. | 242/55 |
| 4,729,521 | 3/1988 | Kuho et al. | 242/67.2 |

FOREIGN PATENT DOCUMENTS 61-123530 6/1986 Japan .
62-11634 1/1987 Japan .
62-11635 1/1987 Japan .

Primary Examiner—Joseph M. Gorski
Attorney, Agent, or Firm—Sughrue, Mion, Zinn, Macpeak & Seas

[57] ABSTRACT

A method of attaching a belt-like member being transferred by a conveyor to a circumference of a drum comprises steps of detecting a leading end and a trailing end of the belt-like member, respectively, transferring the belt-like member by the conveyor until the leading end of the member arrives at a leading end set position, and further transferring the belt-like member and rotating the drum to attach the belt-like member to the circumference of the drum so that at the same time when the leading end of the belt-like member attached to the drum arrives at a set rotated position, the trailing end of the belt-like member arrives at a trailing end set position spaced a predetermined distance from a trailing end detected position where the tailing end was detected in the first step, thereby jointing the leading and trailing ends. In this manner, the belt-like member is attached uniformly on the drum to compensate any excess and shortage in length of the belt-like member relative to a circumferential length of the drum. If the belt-like member has leading and trailing ends bias to longitudinal directions of the member, the belt-like member is transferred at a speed substantially equal to a circumferential speed of the drum only during attaching the bias leading and trailing ends to the drum to avoid deformations of the leading and trailing ends.

2 Claims, 11 Drawing Sheets

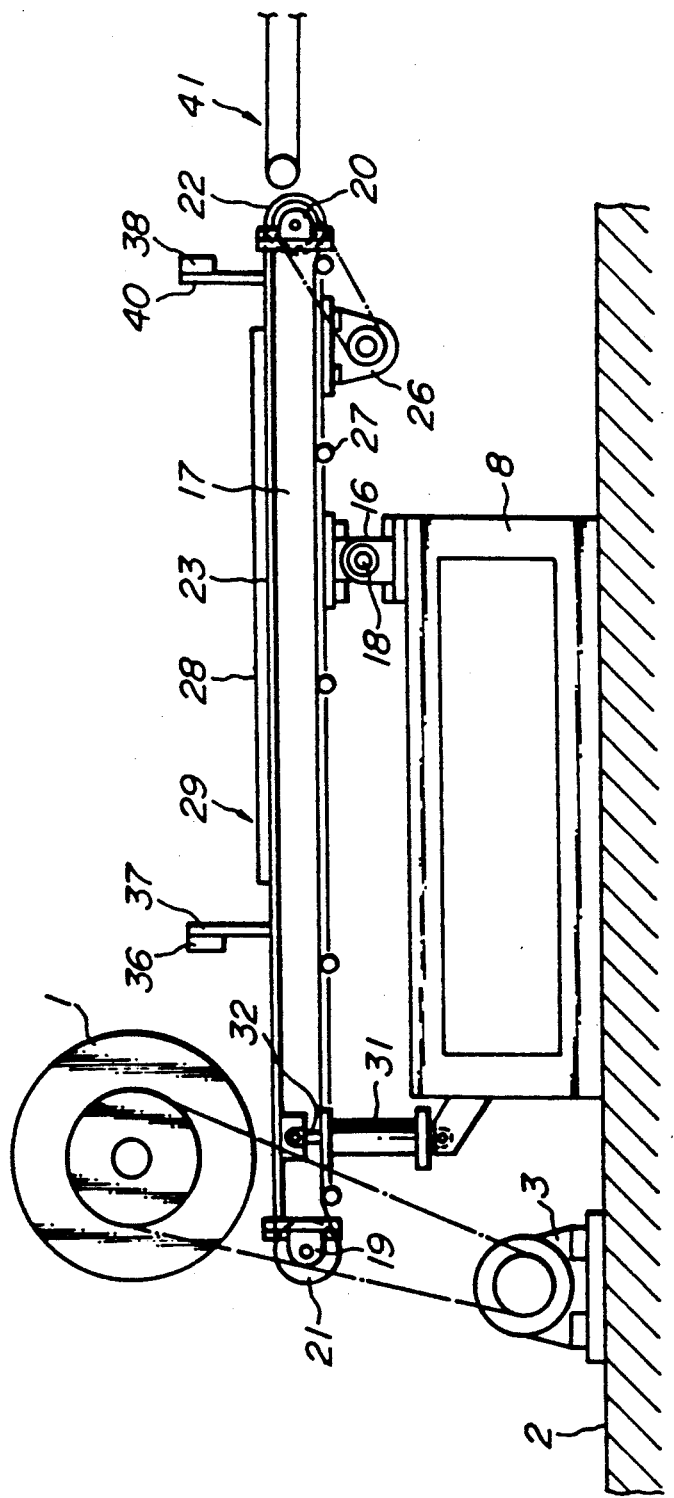
FIG_1

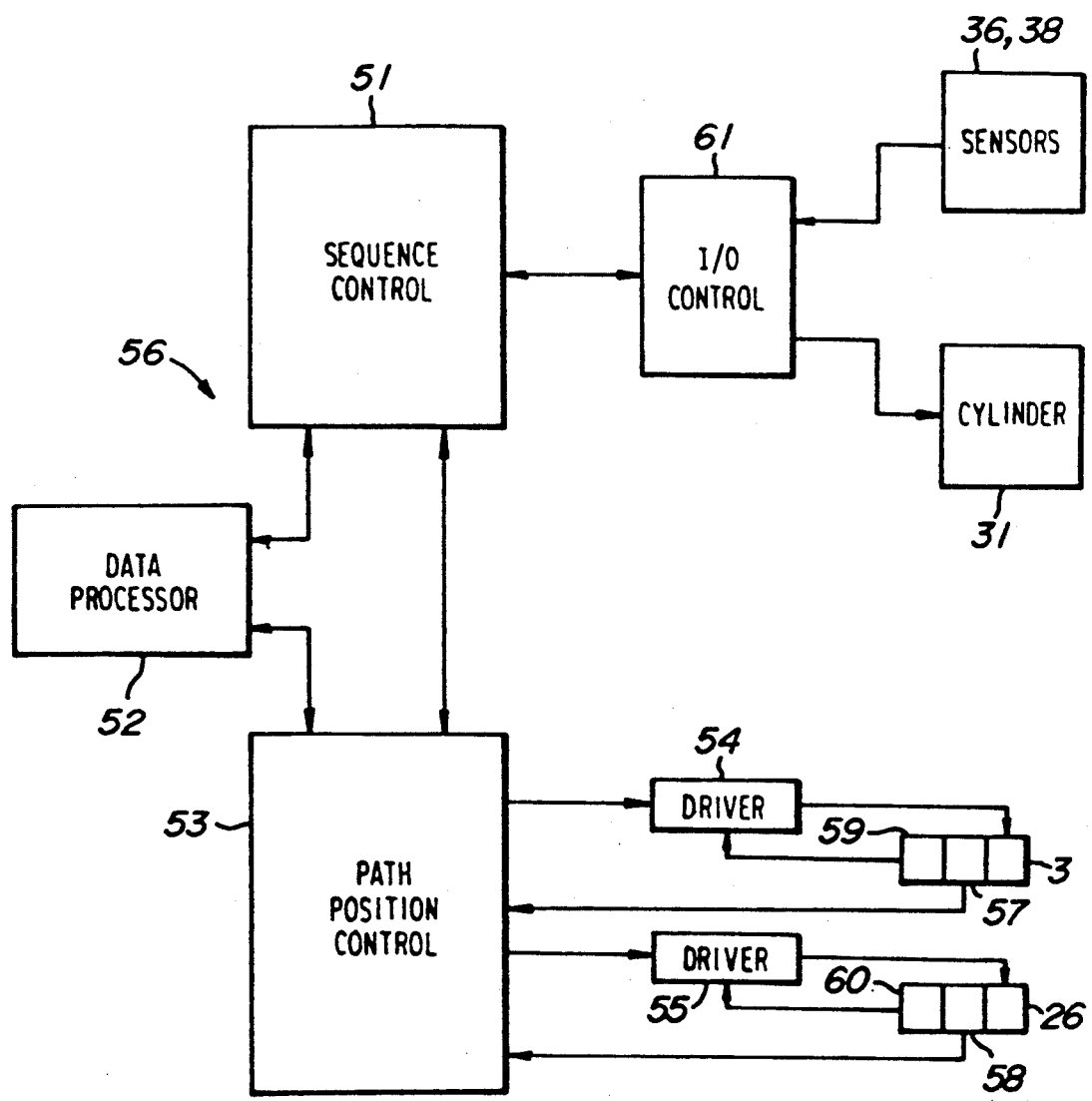
FIG_2

FIG_3a
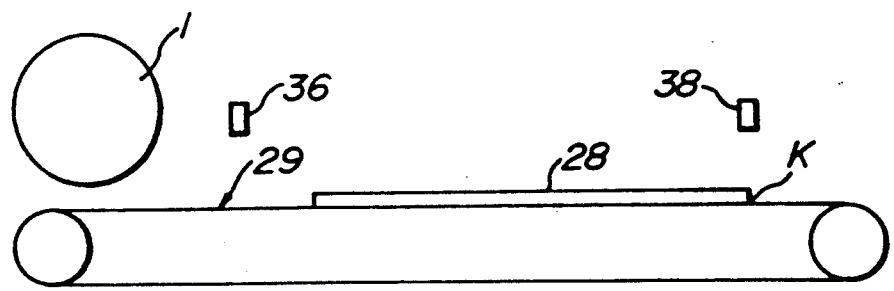
FIG_3b
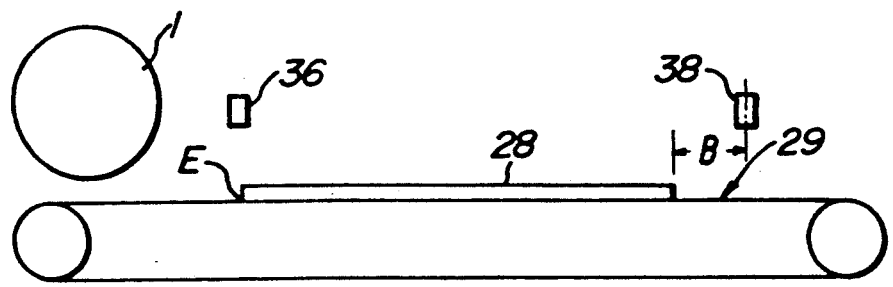

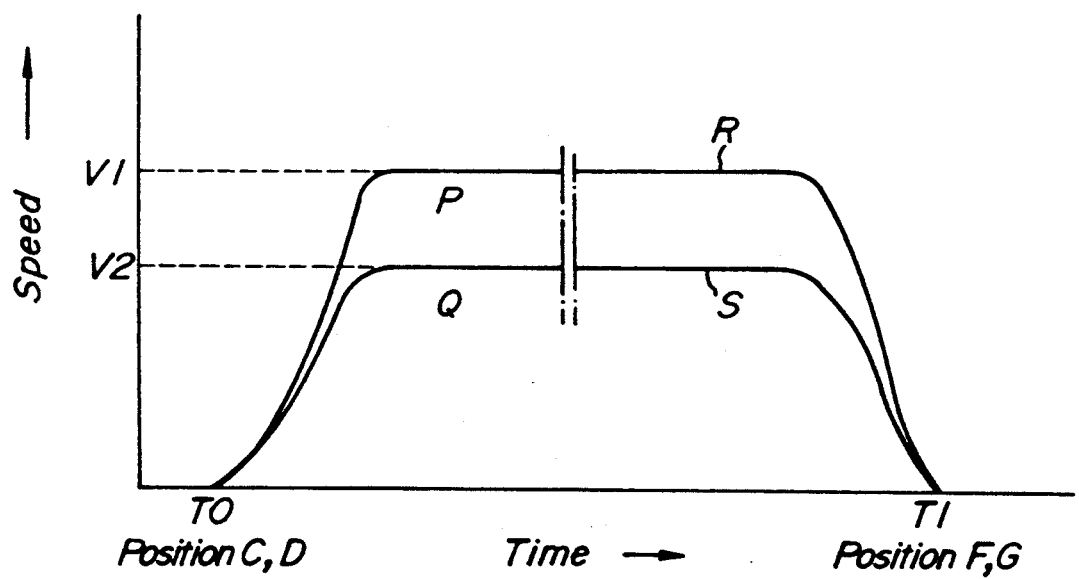
FIG_4

FIG_5
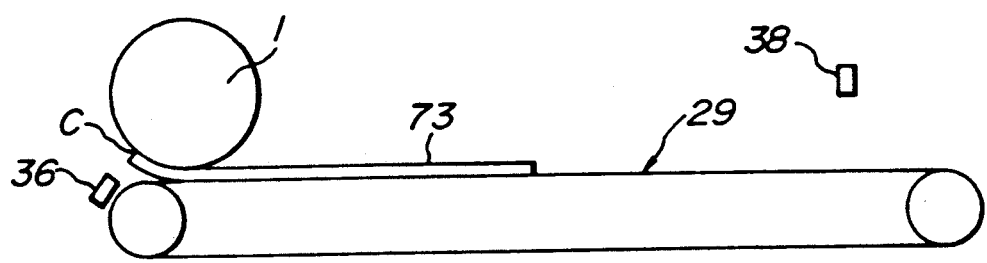
FIG_6a
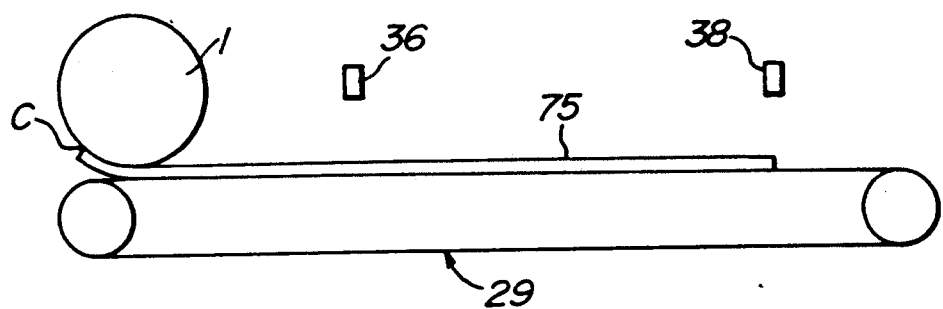
FIG_6b
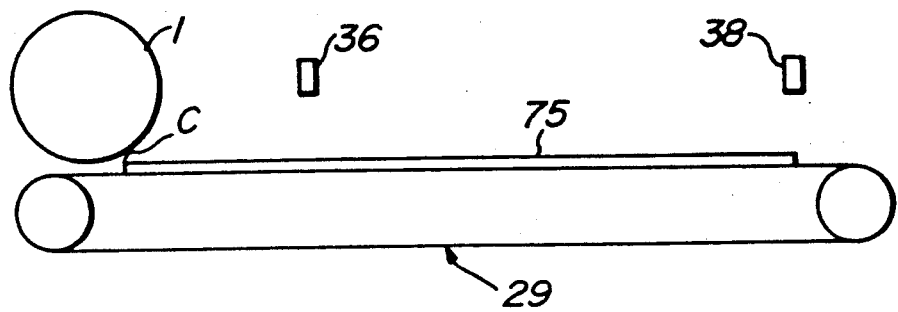

FIG_7a
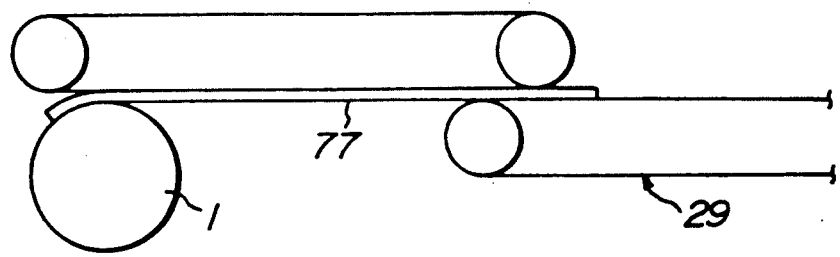
FIG_7b
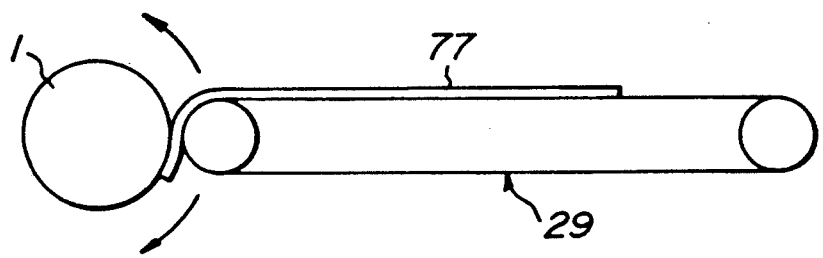
FIG_7c
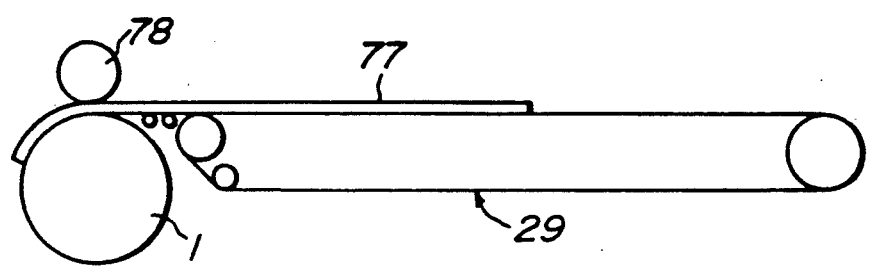

FIG_8a
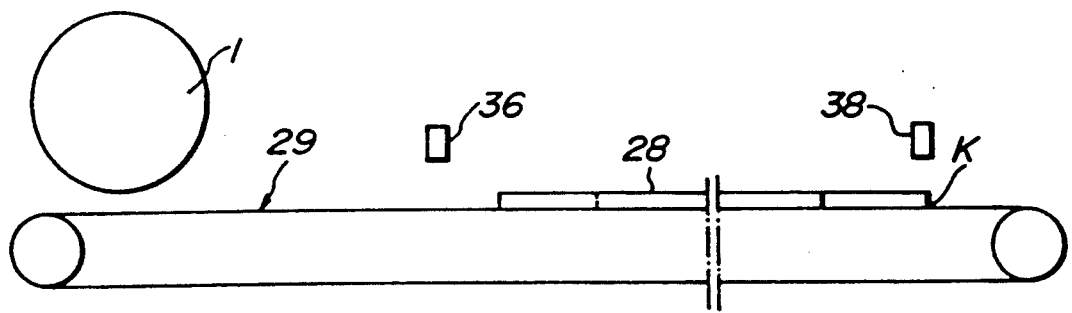
FIG_8b
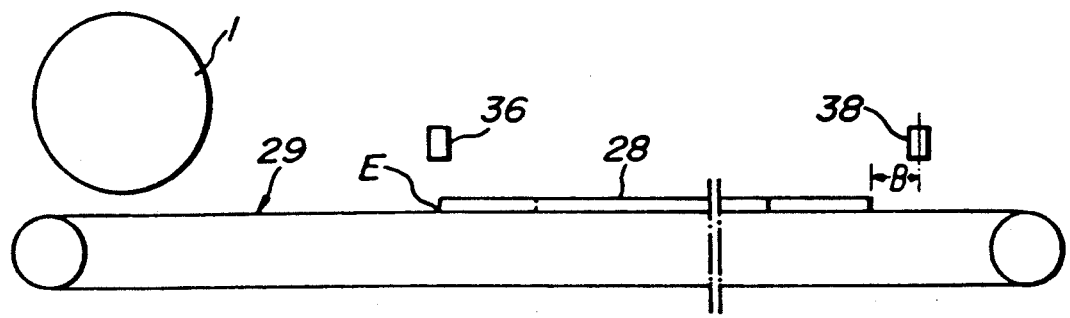

FIG_8c
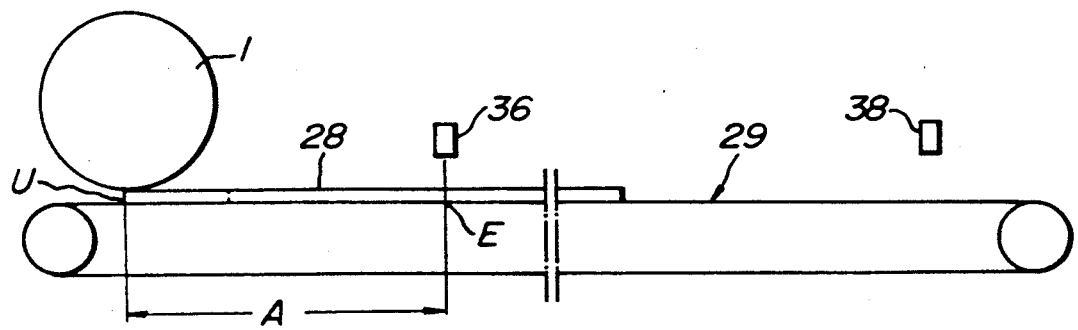
FIG_8d
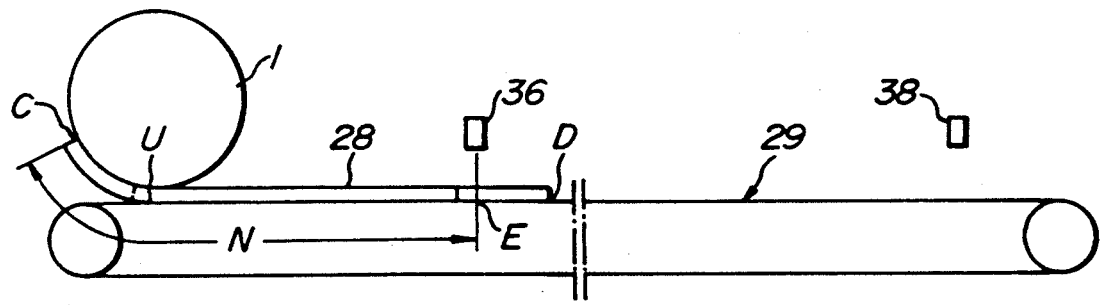

BELT-LIKE MEMBER ATTACHING METHOD AND APPARATUS

This application is a continuation of application Ser. No. 481,654, filed Feb. 14, 1990, and now abandoned, which is a continuation of application Ser. No. 238,443, filed Aug. 31, 1988, and now abandoned.

BACKGROUND OF THE INVENTION

This invention relates to a method and an apparatus for attaching a belt-like member onto a circumference of a drum, while the belt-like member is being transferred by a conveyor.

A method and apparatus for attaching a belt-like member onto a drum has been known, for example, as disclosed in Japanese Patent Application Laid-open No. 62-11,634. The apparatus of the prior art comprises a forming drum, driving means for rotatively driving the drum, transfer means for transferring an unvulcanized tire member held by a plurality of absorbers to a cylindrical outer surface of the forming drum, a first detector for detecting a position of a forward end of the unvulcanized tire member wound about the forming drum, a second detector for detecting a position of a rear end of the unvulcanized tire member relative to the transfer means when the rear end is wound about the drum, and control means for controlling the driving means and the transfer means to elongate the unvulcanized tire member corresponding to a shortage determined by arithmetic operation on the basis of detecting signals from the first and second detectors.

In a case where an unvulcanized tire member is wound and formed on the forming drum with overlapping ends using the apparatus of the prior art, the forming drum is rotated and the transfer means is moved in synchronism with a circumferential speed of the forming drum. The unvulcanized tire member held by the absorbers is supplied onto the outer circumferential surface of the drum or an outer circumferential surface of the unvulcanized tire member already wound about the forming drum. When the unvulcanized tire member has been wound a certain amount on the outer circumferential surface, a forward end of the unvulcanized tire member is detected by the first detector and a rear end thereof is then detected by the second detector. Detecting signals obtained in the detections are fed to the control means. The control means computes the shortage in length of the unvulcanized tire member or the difference between the circumferential length of the drum or wound member plus a predetermined overlapping length and an overall length of the unvulcanized tire member (which has been cut in the length slightly shorter than the circumferential length of the drum) plus the predetermined overlapping length. A control signal obtained in this arithmetic process in the control means is fed to at least one of the driving means for the forming drum and driving means for the transfer means.

As a result, the forming drum and the transfer means are moved relative to each other to pull the unvulcanized tire member so that the length of the unvulcanized tire member is corrected. Thereafter, the rear end portion of the unvulcanized tire member is wound on the outer circumferential surface of the forming drum.

With such an apparatus of the prior art, the length of the unvulcanized tire member is measured by the use of the detectors and control means, and the shortage in length of the tire member relative to the circumferential length of the forming drum is obtained by the arithmetic operation with the aid of signals from the detectors. Therefore, a very expensive and large type control system is necessary. Moreover, every time sizes of tires are changed, the circumferential length of the forming drum must be manually or automatically set with a very high accuracy, and the operation is troublesome and the control is complicated. Further, the ends of the tire member cannot be properly joined due to accumulated errors, such as errors in measuring lengths of tire members and differences between the set lengths and actual circumferential lengths of the drums.

SUMMARY OF THE INVENTION

It is a principal object of the invention to provide a method and an apparatus for attaching a belt-like member to a drum, which eliminates all the disadvantages of the prior art.

In order to achieve this object, a method of attaching a belt-like member being transferred by a conveyor to a circumference of a drum according to the invention, comprises steps of detecting a leading end and a trailing end of the belt-like member, respectively, transferring the belt-like member by the conveyor until the leading end of the member arrives at a leading end set position, and further transferring the belt-like member and rotating the drum to attach the belt-like member to the circumference of the drum so that at the same time when the leading end of the belt-like member attached to the drum arrives at a set rotated position, the trailing end of the belt-like member arrives at a trailing end set position spaced a predetermined distance from a trailing end detected position when the trailing end was detected in the first step, thereby jointing the leading and trailing ends, whereby the belt-like member is attached to the drum without any measurement of a length of the belt-like member and without any arithmetic operation for excess and shortage of the length relative to a circumferential length of the drum.

A belt-like member attaching apparatus according to the invention comprises a rotatable drum, a conveyor for transferring a belt-like member toward the drum, at least one sensor for detecting leading and trailing ends of the belt-like member, and control means for controlling rotation of the drum and movement of the conveyor so that the belt-like member is transferred until the leading end arrives at a leading end set position, and at the same time when the leading end of the member arrives at a set rotated position, the trailing end arrives at a trailing end set position spaced a predetermined distance from a trailing end detected position where the trailing end is detected by the sensor, thereby jointing the leading and trailing ends, whereby the belt-like member is attached to the drum without any measurement of a length of the belt-like member and without any arithmetic operation for excess and shortage of the length relative to a circumferential length of the drum.

The belt-like members may be formed by cutting off a long member before applying them to the drum or when their leading ends are attached to the drum. The leading end and trailing end are first detected, and the belt-like member is transferred by the conveyor until the leading end arrives at the leading end set position. In other words, all that is determined is the arrival position of the leading end of the belt-like member. Therefore, it is not required to control the position of the trailing end. In this case, the leading end can be brought into the leading end set position, for example, by moving the conveyor from the leading end detected position where the leading end is detected by the sensor. The leading end set position is in proximity to an attaching starting position where attaching the member to the drum is started on the drum side or conveyor side. Thereafter, the drum is rotated and the conveyor is moved to transfer the belt-like member so as to attach it about the drum, so that at the same time when the leading end of the belt-like member attached to the drum arrives at set rotated position, the trailing end arrives at the trailing end set position. The set rotated position is determined by referring to the leading end detected position or the intermediate leading end set position. The trailing end detected position is a position spaced a predetermined distance from the trailing end detected position where the trailing end was detected. The arriving position of the trailing end is thus determined by referring to the trailing end detected position. As a result, the leading and trailing ends of the belt-like member are joined in a butting or an overlapping condition. According to the invention, attaching the belt-like member to the drum is thus carried out by controlling only positions of the leading and trailing ends at certain instants without measuring a length of the belt-like member. Therefore, the invention enables the apparatus to be small in size and inexpensive. Even if tire sizes are changed, setting operations of circumferential lengths of drums are not necessary. The leading and trailing ends can be properly joined without errors in setting and measuring the circumferential lengths.

In another aspect of the invention, a method of attaching to a circumference of a drum a belt-like member being transferred by a conveyor and having leading and trailing ends bias to longitudinal directions of the number comprises steps of detecting and points of the leading and trailing ends of the member, respectively, rotating the drum and transferring the belt-like member at a speed substantially equal to a circumferential speed of the drum until the point of the leading end arrives at a first leading end set position on the drum to attach the leading end of the member to the drum, transferring the belt-like member and rotating the drum to attach a center portion of the belt-like member to the circumference of the drum so that at the same time when the point of the leading end of the belt-like member arrives at a second leading end set position, the point of the trailing end of the belt-like member arrives at a trailing end set position spaced a predetermined distance from a trailing end detected position where the point of the trailing end was detected in the first step, and rotating the drum and transferring the belt-like member at a speed substantially equal to a circumferential speed of the drum to attach the trailing end of the member to the drum, thereby joining the leading and trailing ends, whereby the belt-like member is attached to the drum without any measurement of a length of the belt-like member and without any arithmetic operation for excess and shortage of the length relative to a circumferential length of the drum.

The control means for controlling rotation of the drum and movement of the conveyor is constructed so that the belt-like member is transferred until the leading end arrives at a first leading end set position to attach a leading end portion to the circumference of the drum without any elongation and contraction of the leading end portion, that at the same time when the leading end of the belt-like member arrives at a second leading end set position on the drum spaced a predetermined distance from a point where the leading end is started to be attached, the trailing end arrives at a trailing end set position spaced a predetermined distance from a trailing end detected position where the trailing end is detected by the sensor, and that a trailing end portion is attached to the circumference of the drum without any elongation and contraction of the trailing end portion.

With the belt-like member having leading and trailing ends bias to longitudinal directions of the member, the bias leading and trailing end portions are attached to the drum by moving the conveyor at a speed equal to a circumferential speed of the drum, so that the bias leading and trailing end portions are attached to the drum without being elongated or contracted, thereby preventing deformation of the portions and disturbance of positions of the portions.

The invention will be more fully understood by referring to the following detailed specification and claims taken in connection with the appended drawings.

BRIEF DESCRIPTION OF THE DRAWINGS

FIG. 1 is a schematic front view illustrating an apparatus according to the invention;

FIG. 2 is a block diagram illustrating a control system for use in the apparatus shown in FIG. 1;

FIGS. 3a–3d are schematic views for explaining the operations of the apparatus according to the invention;

FIG. 4 is a graph showing driving conditions of servomotors for the drum and the conveyor used in the apparatus according to the invention;

FIG. 5 is a schematic view illustrating a second embodiment of the invention;

FIGS. 6a and 6b are schematic views illustrating a third embodiment of the invention;

FIGS. 7a, 7b and 7c are schematic views illustrating an other method of attaching belt-like members to the drum;

FIGS. 8a–8f are schematic views illustrating a fourth embodiment of the invention.

DESCRIPTION OF THE PREFERRED EMBODIMENTS

Figure 3C:
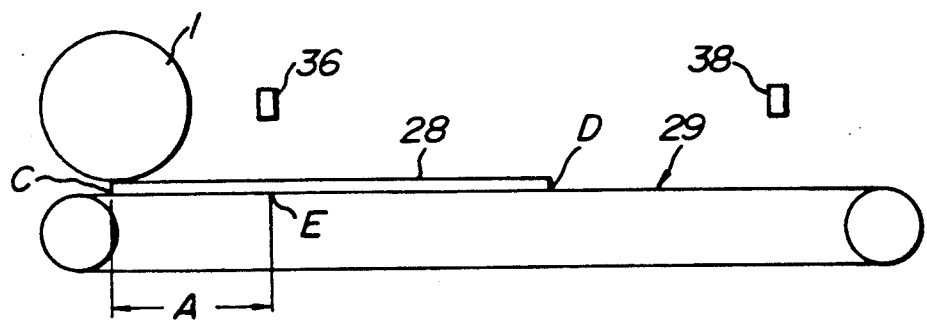
Figure 3D:
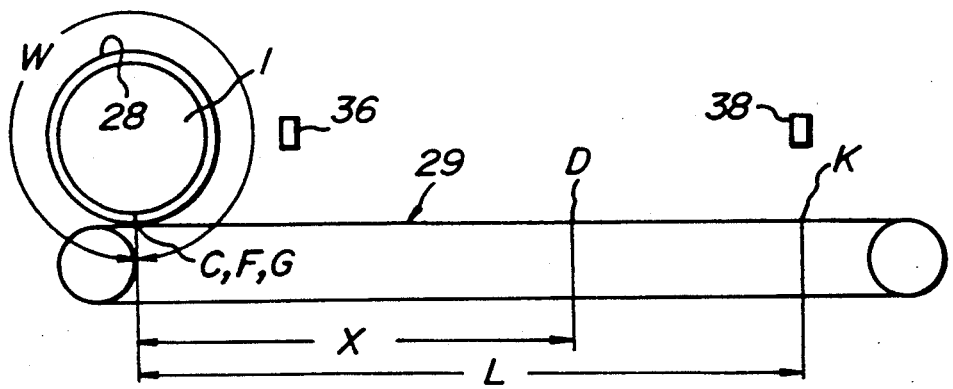

FIG. 1 illustrates a first embodiment of the invention. A forming drum 1 is rotatably supported by a frame (not shown) and is rotated through a required rotating number at any desired speed by means of a DC servomotor 3 with a reduction gear arranged on a floor 2. A frame 8 is arranged on the floor 2 in rear of the drum 1 and provided on its upper surface of the rear end with a bearing 16. The bearing 16 supports a shaft 18 fixed to a center portion of a conveyor frame 17 horizontally extending in parallel with a feeding direction of tire members, thereby rockably supporting the conveyor frame 17 by means of the frame 8.

Rollers 21 and 22 are rotatably supported through bearings 19 and 20 on the front and rear ends of the conveyor frame 17. A conveyor belt 23 extends about the rollers 21 and 22. A DC servomotor 26 with a reduction gear is mounted on the rear end of the conveyor frame 17. When the DC servomotor 26 is energized, the roller 22 is rotated to drive the conveyor 29 at a desired speed.

A plurality of supporting rollers 27 are supported by the conveyor frame 17 and in rolling contact with a returning portion of the conveyor belt 23 to prevent any slack of the belt. The conveyor frame 17, the rollers 21 and 22, the conveyor belt 23, the servomotor 26 and the supporting rollers 27 form as a whole a conveyor 29 for transferring to the drum 1 a belt-like member 28 such as a carcass ply reinforced by steel cords. Electromagnets (not shown) are arranged under the conveyor belt 23.

The front end of the conveyor 29 is positioned immediately below the drum 1. At the front end of the conveyor 29 a head of a cylinder 31 is connected the head having a piston rod 32 whose rod end is connected to the conveyor frame 17. As a result, when the cylinder 31 is actuated, the conveyor 29 is rocked about the shaft 18.

A leading end detecting sensor 36 is mounted on a center portion of the conveyor frame 17 by a bracket 37. The detecting sensor 36 is a reflective photoelectric sensor for detecting a leading end of the belt-like member 28. A trailing end detecting sensor 38 is mounted on the rear end of the conveyor frame 17 through a bracket 40. The detecting sensor 38 is a reflective photoelectric sensor for detecting a trailing end of the belt like member 28.

A supply conveyor 41 is arranged behind the conveyor 29 for supplying to the conveyor 29 a belt-like member 28 which is made by cutting a long belt-like member and has a length slightly shorter than a circumferential length of the drum 1.

FIG. 2 is a block diagram illustrating a control system for the apparatus shown in FIG. 1. Sequence control means 51 memorizes predetermined operating programs, position informations and the like. The sequence control means 51 reproduces positional information according to the operating programs. The reproduced positional information is fed from the sequence control means 51 to a data processor 52 in which the information is arithmetically processed on the basis of various parameters previously stored in the data processor 52 to obtain rotation speeds and numbers of rotation of the servomotors 3 and 26.

The results of the arithmetic operation in the data processor 52 are fed to path positioning control means 53. Upon receipt of the results, the path positioning control means 53 drives the servomotors 3 and 26 through drivers 54 and 55 for the drum and the conveyor, respectively. In this manner, the forming drum 1 is controlled in rotating speed, rotating amount and path positioning, while the conveyor 29 is controlled in transfer speed, transfer amount and path positioning. The control of position of a member moving along its moving path is referred to herein as "path positioning" or "path control". The sequence control means 51, the data processor 52 and the path positioning control means 53 form control means 56 as a whole for controlling the rotation of the drum 1 and the moving of the conveyor 29 by controlling the rotations of the servomotors 3 and 26.

When the servomotors 3 and 26 are rotated, signals are fed from pulse generators 57 and 58 and speed detectors 59 and 60 to the path positioning control means 53 and the drivers 54 and 55 so that so-called "servo-control" is effected. Input and output control means 61 receives control signals from the sequence control means 51 and feeds the signals to the cylinder 31 and others to control them. On the other hand, the input and output control means 61 further receives detecting signals from the leading and trailing end detecting sensors 36 and 38 and feeds the signals to the sequence control means 51.

The operation of the first embodiment of the invention will be explained hereinafter.

The belt-like members handled in this embodiment have leading and trailing ends which are substantially at right angles to longitudinal directions of the members or at slight angles relative to perpendicular to the longitudinal directions. A continuous belt-like member is cut on the supply conveyor 41 along traverse directions substantially at right angles to longitudinal directions of the continuous belt-like member into respective belt-like members 28 having lengths slightly shorter than the one circumferential length of the forming drum. These belt-like members 28 are somewhat different in length from each other owing to errors in cutting and contraction after cutting.

The belt-like member 28 is then centered on the conveyor 41 and the parallelism of cut ends of the belt-like member 28 is corrected by the use of mechanisms (not shown). Thereafter, the supply conveyor 41 and the conveyor 29 are moved at the same speed to transfer the member 28 from the supply conveyor 41 to the conveyor 29. The trailing end of the belt-like member 28 is then detected by the trailing end detecting sensor 38 when the belt-like member 28 has been transferred to the center of the conveyor 29. A detecting signal is fed from the trailing end detecting sensor 38 to the control means 56 and the belt-like member 28 driven by the conveyor 29 is once stopped. This condition is shown in FIG. 3a. At this moment, the positional information of the drum 1 and the conveyor 29 memorized in the sequence control means 51 are cleared. The trailing end detected position K of the trailing end of the member is determined as a reference point for positional controlling of the trailing end.

The conveyor 29 is then again started, and feedback pulses from the conveyor 29 are counted by the control means 56. When the leading end detecting sensor 36 detects the leading end of the belt-like member 28, the counted pulse number at this stage is memorized in the control means 56, and the conveyor 29 is stopped. This condition is shown in FIG. 3b. The positional information of the drum 1 and the conveyor 29 at this stage are memorized in the sequence control means 51. The distance B represents the travel of the belt-like member on conveyor 29 from the point of trailing edge detection at point K. The leading end detected position E of the leading end of the member is determined as a reference point for positional controlling of the trailing end.

Thereafter, the conveyor 29 is driven according to the information previously memorized in the control means 56 to transfer the belt-like member 28 through a predetermined distance A from the leading end detected position E so that the leading end is brought into a leading end set position C which is immediately below an axis of the drum 1. When the leading end of the belt-like member 28 has arrived at the leading end set position C, the trailing end of the member 28 has arrived at a trailing end position D (FIG. 3C). However, the trailing end position D is not exactly definite because the lengths of the belt-like members are somewhat different as above described.

In transferring the belt-like member from the position E to the position C, the servomotor 26 is energized by feeding signals from the path positioning control means 53 through the driver 55 to the servomotor 26, while feedback pulses generated from the pulse generator 58 by the rotation of the servomotor 26 are counted by the positioning control means 53. When the cumulative value of the counted pulses becomes that corresponding to the predetermined distance A, the servomotor 26 is deenergized.

Thereafter, the control means 56 feeds a signal to the cylinder 31 which extends its piston rod 32 according to the signal. As a result, the conveyor 29 is slightly rocked about the shaft 18 in a clockwise direction viewed in FIG. 1 so that the front end of the conveyor 29 approaches the drum 1. Hence, the leading end of the belt-like member 28 is pressed against the outer circumference of the drum 1. This condition is illustrated in FIG. 3C.

Thereafter, the drum 1 is rotated and the conveyor 29 is moved under a controlled condition on the basis of the programs previously stored in the sequence control means 51 so that the belt-like member 28 being transferred is attached to the circumference of the drum 1. In this case, control is so effected that at the starting of the attaching, the leading and trailing ends of the member 28 are positioned at the leading end set position C and the trailing end position D, respectively as shown in FIG. 3C. When the attaching is completed, the leading end of the belt-like member 28 is positioned at a set rotated position F, while the trailing end has arrived at a trailing end set position G. The trailing end set position G is a position spaced a predetermined distance L from the trailing end detected position K. Such control for the operation is effected, for example, by continuously controlling the servomotors 3 and 26 with respect to the movement of the member along its path.

FIG. 4 illustrates relations between operating time and operating speed in the continuous control of the servomotors 3 and 26 between two points (the leading end set position C and the set rotated position F with respect to the drum 1, and the trailing end position D and the trailing end set position G with respect to the conveyor 29). These servomotors 3 and 26 must be simultaneously started and simultaneously stopped. In FIG. 4, an area P surrounded by a curve R illustrates a rotational amount of the servomotor 3 (moved distance of the leading end of the member 28, or circumferential distance W from the leading end set position C to the set rotated position F) and an area Q surrounded by a curve S illustrates a rotating amount of the servomotor 26 (moved distance of the trailing end of the member 28, or straight line distance X from the trailing end position D to the trailing end set position G). These areas P and Q correspond to sums of the feedback pulses generated from the pulse generators 57 and 58 in response to rotations of the servomotors 3 and 26, respectively. Moreover, the sum of the feedback pulses from the servomotor 26 upon completion of attaching is in fact the pulse number corresponding to the area Q plus the feedback pulse number when the convey 29 is moved twice, because the summing up of the pulses is started at the trailing end detected position K. The difference between the areas P and Q results from the fact that the pulse rates are different in the servomotors 3 and 26.

The operation of the control means 56 carrying out the control for the movement of the belt-like member along the path will be explained hereinafter.

The data processor 52 computes the rotational amount of the drum 1 and the transferred distance of the conveyor 29 on the basis of positional informations of the servomotors 3 and 26 produced from the sequence control means 51. Then, a maximum speed V1 and curves of acceleration and deceleration of the servomotor constituting a base of the operation, the servomotor 3 in this case, are obtained. From the results of the arithmetic operation, the operating time (T1-T0) between the two points are obtained. A maximum speed V2 and curves of acceleration and deceleration of the other servomotor 26 are then computed so that the servomotor 26 arrives at the target point when the operating time has lapsed. From the results of the arithmetic operation, time-speed curves R and S and the lapsed time at respective points from the time T0 at which the starting information is outputted are obtained.

The curves R and S are then time-divided by the data processor 52 to output moved distances at the respective points to the path positioning control means 52. As a result, the path positioning control means 53 outputs signals proportional to the moved distance to the drivers 54 and 55, respectively, and monitors feedback pulses from the pulse generators 57 and 58 for the servomotors 3 and 26 to drive the servomotors along the time-speed curves R and S so as to meet demands from the data processor 52, thereby achieving the path control between the two points.

In this manner, when the belt-like member 28 is attached onto the circumference of the drum 1, the leading and trailing ends of the belt-like member 28 are joined in a butting or overlapping condition. In case of joining the ends of the member in butting, the leading end set position C, the set rotated position F and the trailing end set position G are at the same position. In case of joining the ends in overlapping, the leading end set position C and the trailing end set position G are at the same position, but the set rotated position F is spaced from the trailing end set position G a predetermined distance in a rotating direction of the drum 1. This predetermined distance is equal to the overlapping amount of the leading and trailing ends of the belt-like member 28.

The belt-like member 28 is controlled so that the leading end trailing ends of the member 28 arrive at the positions above described when the attaching is completed. As the length of the belt-like member 28 is slightly shorter than the one circumferential length of the drum 1, the moving distance of the leading end is slightly longer than that of the trailing end of the member, with the result that the belt-like member is elongated at a constant rate over a long distance to compensate the shortage in length of the member 28. By keeping the circumferential speed of the drum 1 and the moving speed of the conveyor 29 constant, the belt-like member 28 is uniformly elongated over its length without any disturbance of cords. However, the circumferential speed of the drum 1 and the moving speed of the conveyor 29 may be changed in the attaching operation.

- In case the length of the belt-like member 28 is slightly longer than the circumferential length of the drum 1, the belt-like material is compressed in the lengthwise direction to correct the excess in length. If the length of the belt-like member 28 is equal to the circumferential length of the drum 1, the length of the member 28 is not changed. It is clear that the present invention is quite different in the prior art. In the prior art the lengths of belt-like member are measured to compute shortage in length on the basis of which correction is effected. Moreover, according to the invention, even if there are differences in length of the belt-like members, the positional control of leading and trailing ends is effected for the respective belt-like members 28 so that all these irregularities in length are absorbed in the attaching process.

The piston rod 32 of the cylinder 31 is then retracted to rock the conveyor 29 in a counterclockwise direction viewed in FIG. 1 into the initial position. In this embodiment, the belt-like member is elongated over its entire length, so that this embodiment is suitable for belt-like member whose ends are perpendicular to the longitudinal direction of the member or inclined only at slight angles to the perpendicular.

FIG. 5 illustrates a second embodiment of the invention, wherein the leading end detecting sensor 36 is arranged below and in front of the drum 1 so that a leading end of the belt-like member 73 is detected by the sensor 36 after the leading end has been slightly attached to the drum 1. In this case, the drum 1 starts its rotation for attaching the belt-like member 73 to the drum when a trailing end of the member 73 is detected by the trailing end detecting sensor 38. The circumferential speed of the drum 1 in such a case is substantially equal to the moving speed of the conveyor 29. As a result, the leading end of the member 73 is slightly attached to the circumference of the drum 1 without any elongation or contraction of the leading end. When the leading end arrives at a leading end set position C and is detected by the leading end detecting sensor 36, the drum 1 and the conveyor 29 are once stopped. Thereafter, the belt-like member 73 is attached to the circumference of the drum 1 in the same manner in the first embodiment. In the event that the leading end detecting sensor is arranged at the leading end set position C in this manner, the processes of transferring the leading end to the leading end set position C and detecting the leading end thereat are simultaneously effected. Moreover, the leading end detecting sensor may be provided below the axis of the drum 1 or in the conveyor 29, but only insofar the conveyor comprises a plurality of conveyor belts spaced apart which do not interfere with the provision of the detector sensor 36.

FIGS. 6a and 6b illustrate a third embodiment of the invention. In this embodiment, a leading end set position C is not previously set but is determined by a position of a leading end of a belt-like member at a moment when a trailing end of the belt-like member is detected by a trailing end detecting sensor 38. As a result, if a length of the belt-like member is longer than a distance between the drum 1 and a trailing end detecting sensor 38, a leading end set position C is on a circumference of the drum 1 as shown in FIG. 6a. On the other hand, if a length of the belt-like member is shorter than the distance, a leading end set position C is on a conveyor 29 as shown in FIG. 6b. The other operations are similar to those in the previous embodiments.

In the present invention, one common sensor may be used serving as the leading end detecting sensor 36 and the trailing end detecting sensor 38, and counting of pulses from the conveyor 29 may be started from a moment when the leading end of the belt-like member is detected by the common sensor. In this case, the counted value when the trailing end is detected by the sensor may be previously memorized in the sequence control means 51. This is used to control the rotation of the drum 1 and the movement of the conveyor 29 to control positions of the leading and trailing ends of the belt-like member 28.

In the first embodiment, the distance between the leading and trailing end detecting sensors 36 and 38 is longer than the length of one belt-like member. The distance between the leading and trailing end detecting sensors may be shorter than the length of the belt-like member as in FIG. 6a. In this invention, moreover, the cutting of the belt-like member into constant lengths, centering of the cut belt-like and corrections of parallelism of cut ends of the members may be carried out on the conveyor 29. Further, the belt-like member may be cut by a cutter or the like when a predetermined length of the member is wound about the drum 1 without previously cutting the member.

In the present invention, in order to attach a belt-like member 77 from the conveyor 29 onto the drum 1, the member may be applied to the drum from the above as shown in FIG. 7a. As an alternative, the belt-like member may be applied to the drum 1 from the rear side thereof with the aid of the pulley of the conveyor 29 as shown in FIG. 7b, or the belt-like member may be applied to the drum with the aid of a separate pressing roller 78 as shown in FIG. 7c. In the present invention, a third sensor for detecting the leading end of the belt-like member may be provided slightly behind the leading end detecting sensor 36 so that when the leading end is detected by the third sensor, the moving speed of the conveyor 29 may be decreased.

As can be seen from the above explanation, the invention enables the apparatus to be small in size and inexpensive because any measurement of length and its arithmetic operation are not needed. Even if tire sizes are changed, setting operations of circumferential lengths of drums are not necessary so that operations and controls are simplified and jointing accuracy of belt-like members is improved because there is no error occurring in setting operations of circumferential lengths of drums.

FIGS. 8a–8f illustrate a fourth embodiment of the invention. For the sake of clarity, only differences of this embodiment from the first embodiment will be explained.

The belt-like members handled in the fourth embodiment have leading and trailing ends which are bias to longitudinal directions of the members.

As the leading end of the belt-like member is on the bias, it includes a forwardmost or preceding end at one edge and a retracted end at the other edge. The forwardmost end is referred to as "first leading end" and the retracted end is referred to as "second leading end" herein. In the same manner, the trailing end includes a preceding end at the one edge which is referred to as "first trailing end" and a rearmost end at the other edge which is referred to as "second trailing end" herein.

The belt-like member is transferred on the conveyor 29 and a second or rearmost trailing end is detected by the trailing end detecting sensor 38 in the same manner as in the first embodiment. FIG. 8a illustrates this trailing end detected position K which is determined as a reference point for positional controlling of the trailing end.

The conveyor 29 is then again started, and when the leading end detecting sensor 36 detects the first leading end of the member, the conveyor 29 is stopped as shown in FIG. 8b corresponding to FIG. 3b in the first embodiment. The leading end detected position E of the first leading end of the member is determined as a reference point for positional controlling of the trailing end. This position is shown in FIG. 8b corresponding to FIG. 3b of the first embodiment.

Thereafter, the conveyor 29 is driven according to the information previously memorized in the control means 56 to transfer the belt-like member 28 through a predetermined distance A from the leading end detected position E so that the first leading end is brought into a regulated position U. The control in this case is substantially the same as in the first embodiment for bringing the leading end into the leading end set position C. Further, the conveyor 29 is slightly rocked about the shaft 18 so that the first leading end of the belt-like member 28 is pressed against the outer circumference of the drum 1 as shown in FIG. 8c in the same manner as in the first embodiment.

In this case, the leading end of the belt-like member 28 is bias to its longitudinal direction, and the first leading end is located substantially in the proximity immediately below the axis of the drum 1 when the leading end is about to be pressed on the drum. The belt-like member 28 is transferred through the predetermined distance A as above described, in order to press the leading end of the member 28 against the drum 1 with a great certainty when the conveyor 29 is rocked.

Thereafter, the drum 1 is rotated one revolution and the conveyor 29 is moved at the same speed as the circumferential speed of the drum 1 on the basis of the programs previously stored in the sequence control means 51. Therefore, the belt-like member is transferred without being elongated or contracted until the first leading end arrives at a first leading end set position C, thereby attaching the leading end to the drum 1 as shown in FIG. 8d. In this case, the first leading end set position C is spaced from the leading end detected position E by a predetermined distance N. At the commencement of this process, the first leading end of the member 28 has already arrived at the regulated position U which is spaced from the leading end detected position E by the predetermined distance. In this process, therefore, the operation for transferring the first leading end of the member from the regulated position U to the first leading end set position C is controlled. Such a control for the operation is effected, for example, by continuously controlling the servomotors 3 and 26 with respect to the movement of the member along its path.

Relations between operating time and operating speed in the continuous control of the servomotors 3 and 26 between two points (the first leading end set position C and the second leading set position F with respect to the drum 1, and the trailing end position D and the trailing end set position G with respect to the conveyor 29) are shown in FIG. 4. The area P illustrates a rotating amount of the servomotor 3 and the area S illustrates a rotating amount of the servomotor 26 as in the first embodiment.

In this embodiment, the leading end of the belt-like member 28 is on the bias relative to the longitudinal direction. In order to maintain the straightness and parallelism of the leading and trailing ends in attaching the belt-like member to the drum, the circumferential speed of the drum 1 and the moving speed of the conveyor 29 must be substantially equal to each other at all points on the curves R and S. Therefore, the circumferential distance of the rotated drum 1 and the moving distance of the conveyor 29 during the time from (T0) to (T1) are substantially equal. In this manner, the bias leading end portion of the member 28 is attached to the drum without being elongated or contracted until the first leading end of the member 28 arrives at the first leading end set position C. At this time, the second or rearmost trailing end of the member 28 is located at the trailing end position D as shown in FIG. 8d. However, the trailing end position D is not exactly definite because the lengths of the belt-like members are somewhat different as above described.

The operation of the control means 56 for controlling the movement of the belt-like member along the path in this embodiment is quite the same as in the first embodiment.

Figure 9A:
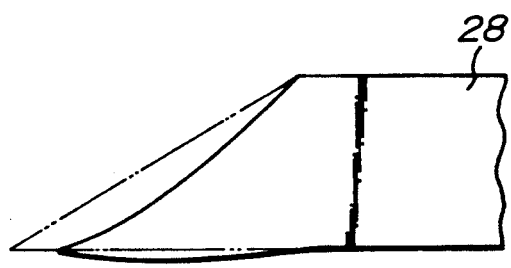
FIGS. 9a and 9b schematically illustrate leading ends of a belt-like member deformed due to a difference between a circumferential speed of the drum and a moving speed of the conveyor.
Figure 9B:
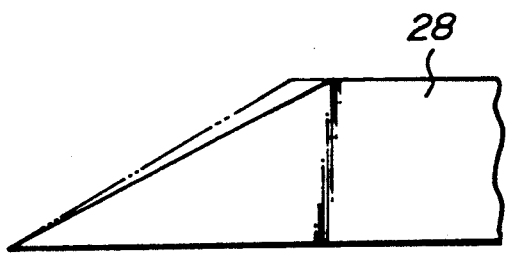

If there is a difference between the circumferential speed of the drum 1 and the moving speed of the conveyor 29, for example, the former is slower than the latter, the leading end, particularly the first leading end of the belt-like member will be deformed from the normal shape shown in phantom lines in FIG. 9a to a shape shown in solid lines. On the other hand, when the circumferential speed of the drum 1 is faster than the moving speed of the conveyor 29, the leading end, particularly second leading end of the belt-like member 28 will be deformed as shown in FIG. 9b. Therefore, the leading and trailing ends of the belt-like member are not uniformly. In this embodiment, accordingly, the circumferential speed of the drum 1 and the moving speed of the conveyor 29 are controlled by time-dividing the curves R and S inclusive the acceleration and deceleration zones by a very short period of time less than 10 msec so that the maximum value of the error is restrained less than 0.1-0.2% of feeding speeds of the belt-like member, thereby maintaining straightness and angles at the cut ends of the member with high accuracy.

Thereafter, the drum 1 and the conveyor 29 are operated to attach the central portion of the belt-like member 28 to the drum, while the member 28 is being transferred to the drum until the first leading end arrives at a second leading end set position F (having nothing to do with the second leading end) and the second or rearmost trailing end arrives at a trailing end set position G. The second leading end set position F coincides with a position H from which the bias trailing end portion is attached to the drum 1. The trailing end set position G is a position spaced a predetermined distance L from the trailing end detected position K where the second or rearmost trailing end is detected by the trailing end detecting sensor 38. A length J of the bias leading end portion on the drum 1 coincides with a length M of the bias trailing end portion on the conveyor 29 in case that the leading and trailing ends are to be jointed in a butting condition. In case that the leading and trailing ends are joined overlapping, the length M minus the length J is substantially equal to an overlapping length of the joined ends.

Referring back to FIG. 4, the area P surrounded by the curve R corresponds to the moved distance of the first leading end of the belt-like member 28 or a distance W from the first leading end set position C to the second leading end set position F. Distance P is from first leading end set position F to second leading end set position C. The area Q surrounded by the curve S corresponds to the moved distance of the second or rearmost trailing end of the member 28 or a straight distance X from the trailing end position D to the trailing end set position G. As the moved distance of the first leading end is slightly larger than the moved distance of the second trailing end, the servomotors 3 and 26 are controlled so that the transfer speed of the conveyor 29 is slower at a constant rate than the circumferential speed of the drum 1 at any points on the curves R and S. Therefore, the central portion of the belt-like member except the bias leading and trailing end portions is attached to the drum 1, while being uniformly elongated at a constant rate. In attaching the belt-like member to the drum, a ratio of the circumferential speed of the drum 1 to the moving speed of the conveyor 29 may be changed.

Figure 8E:
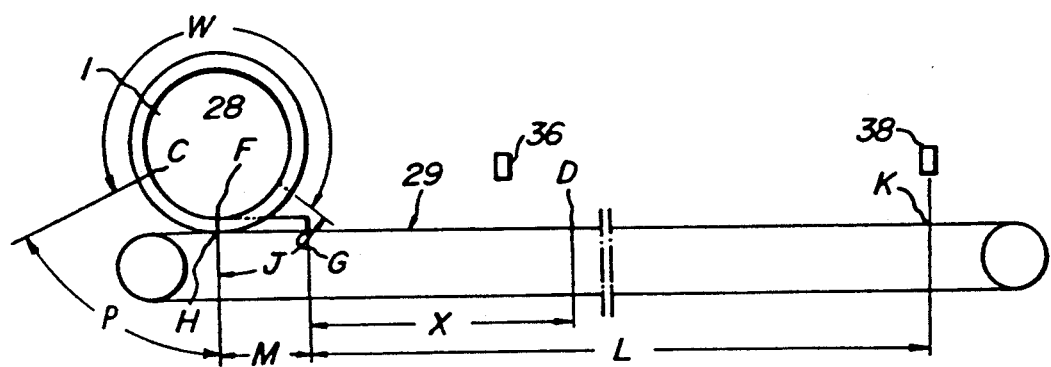
Figure 8F:
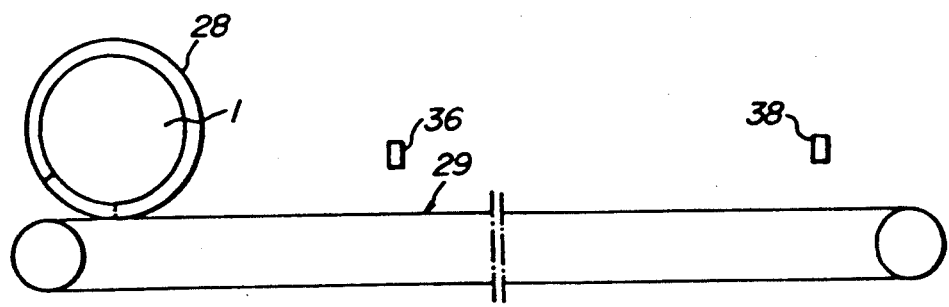

Thereafter, the servomotors 3 and 26 are operated to actuate the drum 1 and the conveyor 29, so that the remaining trailing end portion is attached to the drum 1 as shown in FIG. 8f. In this case, the servomotors 3 and 26 so controlled that the circumferential speed of the drum 1 and the moving speed of the conveyor 29 are substantially equal to each other, with the result that the trailing end portion is attached to the drum without being elongated or contracted, thereby preventing straightness and angles of the end from changing and therefore improving the accuracy of jointing. The control is substantially the same as in attaching the leading end portion. In this manner, the belt-like member is attached in its entirety to the drum with the leading and trailing ends being in butting or overlapping. Then, the piston rod 32 of the cylinder 31 is retracted to rock the conveyor 29 in the counterclockwise direction viewed in FIG. 1 into its initial position.

In this embodiment, the leading end detecting sensor 36 is provided above a mid portion of the conveyor 29. However, the leading end detecting sensor 36 may be provided in front of the front end of the conveyor 29, or below the drum 1 or at the first leading end set position C. If the leading end detecting sensor is provided at the first leading end set position C, the detection of the first leading end and transferring of the first leading end to the first leading end set position C are simultaneously carried out.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A method of attaching a belt-like member being transferred by a conveyor to a circumference of a drum, comprising steps of; detecting a trailing end of the belt-like member at a trailing end reference point (K), moving said belt-like member on said conveyor and detecting a leading end thereof at a leading end reference point (E), storing the distance (B) the belt-like member travels once said trailing end has been detected at the point (K) until the leading end has been detected at point (E), transferring the belt-like member by the conveyor until the leading end of the member arrives at a predetermined leading end set position (C) spaced a predetermined distance (A) from said leading end reference point (E), the leading end set position being in the proximity of a position on said drum where attaching of the leading end is to start, adding the distance (A) to the distance (B), thereby determining a trailing end point (D) and a distance (X), wherein point (D) is spaced from point (K) by the distance (A)+(B) and distance (X) is the distance from point (D) to a trailing end set position (G), which is coincident with set position (C), regulating the speed of said conveyor and said drum as a function of point (D) and distance (X), such that the belt-like member is transferred and the drum is rotated, whereby the belt-like member is attached to the circumference of the drum in a manner so that at the same time when the leading end attached to the drum arrives at a predetermined set rotated position which is coincident with position, the trailing end of the belt-like member arrives a said trailing end set position (G), wherein said regulating absorbs excess and shortage in length of the member and joins the leading and trailing ends without any prior arithmetic operation for excess and shortage of the length relative to a circumferential length of the drum.

2. A method of attaching to a circumference of a drum a belt-like member being transferred by a conveyor and having tapered leading and trailing portions formed by cutting obliquely relative to longitudinal directions of the member, comprising steps of; detecting a trailing end of the member at a trailing end reference point (K), moving said belt-like member on said conveyor and detecting a leading end thereof at a leading end detected position (E), storing the distance (B) the belt-like member travels once the trailing end has been detected at point (K) until the leading end has been detected at said leading end detected position (E), transferring the belt-like member by said conveyor until the leading end of the member arrives at a first predetermined leading end set position (F) spaced a predetermined distance (A) from the leading end reference point (E), the leading end set position being in the proximity of a position on said drum where attaching of the leading end is to start, then transferring the belt like member until the leading end of the member arrives at a second predetermined set position (C) located on the drum, and storing the distance (P) the leading end travels from position (F) to position (C), adding the distances (A), (B) and (P) together, thereby determining a trailing end point (D) and a distance (X), wherein point (D) is spaced from point (K) by a distance (A)+(B)+(P) and distance (X) is the distance from point (D) to a trailing end set position (G), which position (G) is located between position (F) and position (D) and is spaced from said position (F) by a distance (M), wherein point (D) is spaced from position (F) by the distance (M)+(X), regulating the speed of the conveyor and drum as a function of point (D) and distance (X) such that, the belt-like member is transferred and the drum is rotated, whereby the leading end of the member is attached to the drum and a center portion of the belt-like member is attached to the circumference of the drum, in a manner so that at the same time when the leading end attached to the drum arrives at a set position which is coincident with position (F), the trailing end arrives at said trailing end set position (G), and wherein said regulating absorbs excess and shortage in length of the member and joins the tapered leading portion to the tapered trailing portion by overlapping one with the other without any prior arithmetic operation for excess and shortage of the length relative to a circumferential length of the drum.

* * * * *